W. T. McLEAN.
DEMOUNTABLE RIM.
APPLICATION FILED MAR. 11, 1916.

1,194,854.

Patented Aug. 15, 1916.

Witness:
John Enders

Inventor:
William T. McLean
by Fred Gerlach
his Atty.

UNITED STATES PATENT OFFICE.

WILLIAM T. McLEAN, OF CHICAGO, ILLINOIS, ASSIGNOR OF ONE-HALF TO GEORGE W. LYNDON, OF CHICAGO, ILLINOIS.

DEMOUNTABLE RIM.

1,194,854.  Specification of Letters Patent.  Patented Aug. 15, 1916.

Application filed March 11, 1916. Serial No. 83,452.

*To all whom it may concern:*

Be it known that I, WILLIAM T. McLEAN, a citizen of the United States, and a resident of Chicago, in the county of Cook and State of Illinois, have invented certain new and useful Improvements in Demountable Rims, of which the following is a full, clear, and exact description.

The invention relates to demountable rims and more particularly to the devices for removably securing the rim on the wheel body.

It is now common practice to employ wedge-lugs for securing the rim on the wheel-body, and to removably secure them by bolts and nuts. Usually the nuts must be disconnected from the bolts to permit withdrawal of the wedge-lugs, to permit removal of the rim.

The primary object of the invention is to provide more quickly operable devices than nuts, for removably securing the lugs in operative position or for clamping them against the rim. This object is attained by the employment of a radially disposed laterally movable cam-lever, which is provided with a handle whereby it may be quickly shifted to operate the lug. By utilizing such a lever, the lugs may be operated much more quickly and conveniently than is possible by a nut and wrench.

The invention consists in the novel features hereinafter set forth and more particularly defined by claims at the conclusion hereof.

Figure 1:
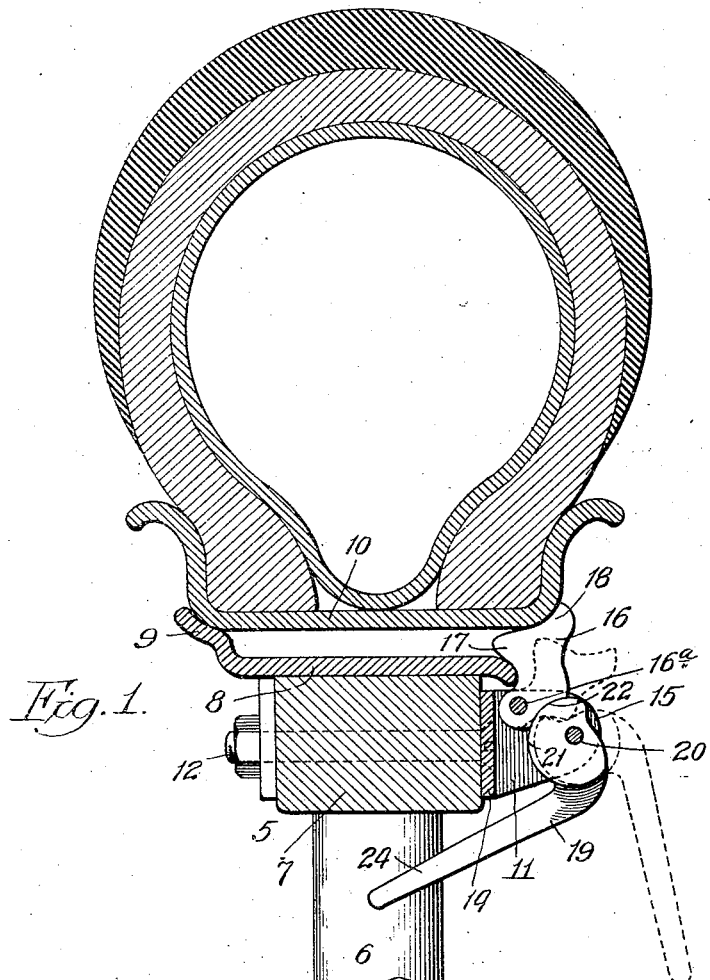
Figure 2:
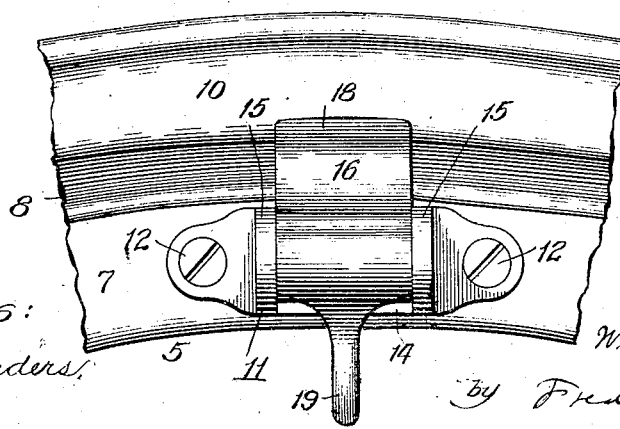

In the drawings: Figure 1 is a transverse section of a wheel embodying the invention. Fig. 2 is a side elevation of a portion of the wheel.

5 denotes a wheel body which may be of usual construction and comprises spokes 6, a felly 7 and a metallic band 8 fixed on the felly. The band 8 is provided at one side with a flange 9 to support a demountable tire-carrying rim 10 of any suitable or usual construction.

The improved securing device comprises a bracket 11 which is secured to the wheel-body by bolts 12 which extend through the felly 7. This bracket comprises a back-wall 14 fitting against one side of the felly and a pair of laterally extending lugs or ears 15. A clamping-lugs 16, provided with an integral extension 17, to fit between and engage the rim and the band respectively, and an extension 18 to engage one side of the rim, is pivotally connected to the bracket 11 by a pin 16$^a$ which extends through lugs 15 on the bracket. The pin 16$^a$ is arranged to permit the lug 16 to swing outwardly and toward the axis of the wheel, so that the rim may be placed on the wheel from one side thereof in the usual manner. A lever 19 is pivoted to bracket 11 by a pin 20 passing through the lever, and lugs 15, so that the lever may be swung transversely in the wheel and is provided with a cam-surface 21 adapted to engage a correspondingly shaped cam-surface 22 on lugs 16, these surfaces being of proper form to force the lug 16 inwardly and into position to clamp the rim on the wheel. This lever comprises a handle-extension 24 which, when the lever is in position to secure the lug 16 in operative position, extends laterally and inwardly, as shown in Fig. 1, so that it will not project beyond the tire or rim, when the rim is secured to the wheel body. These cam-surfaces are of such contour and are disposed relatively to the fulcrum pin 20 of the lever, so that the outward stresses to which the lug 16 is subjected by the rim, will tend to hold the lever in its operative position, instead of tending to force it outwardly or release it, and, therefore, the device is self-locking in operative position. If desired, there may be a sufficient looseness around pin 16$^a$, to permit the extension to adjust itself between the rim and band. It will be understood that the necessary number of securing devices all similar in construction will be used equidistantly spaced around the wheel-body.

Assuming the rim to be secured on the wheel by the lugs, as shown by full lines in Fig. 1, when it is desired to remove the rim, it is only necessary to swing the handles 24 of the levers 19 outwardly approximately into the position shown in dotted lines. Such movement of these levers will bring the coöperating cam-surfaces 21 and 22 in relative position to permit the lug 16 to swing laterally and toward the axis of the wheel sufficiently to release the rim and permit it to clear the lugs in laterally removing it from the wheel. Reverse shift serves to force the clamping lugs into operative position. If desired, the handle may be operated by a hammer or a piece of pipe may be slipped over the handle 24, when additional leverage for operating them is desired.

The invention thus exemplifies devices for removably securing a demountable rim on a wheel-body and in which the necessity of applying the wrench to a nut is avoided.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a wheel body and a demountable rim, of devices for removably securing the rim on the body, each comprising a clamping-lug and a cam-lever pivoted to and at one side of the wheel-body to swing laterally, the lug and lever being provided with coöperating cam-surfaces for operating the lug against the rim.

2. The combination with a wheel-body and a demountable rim, of devices for removably securing the rim on the body, each comprising a clamping lug and a cam-lever pivoted to and at one side of the wheel body to swing laterally, the lug and lever being provided with coöperating cam-surfaces for operating the lug against the rim, said lever being disposed to extend toward the axis of the wheel when it is in operative position.

3. The combination with a wheel body and a demountable rim, of devices for removably securing the rim on the body, each comprising a pivoted clamping lug and a cam lever pivoted to and at one side of the wheel body to swing laterally, the lug and lever being provided with coöperating cam-surfaces for operating the lug to secure the rim.

4. The combination with a wheel body and a demountable rim, of devices for removably securing the rim on the body, each comprising a bracket fixed to the wheel-body, a clamping-lug movably connected to said bracket, and a cam-lever pivoted to said bracket at one side of the wheel body to swing laterally, the lug and lever being provided with coöperating cam-surfaces for operating the lug against the rim.

5. The combination with a wheel body and a demountable rim, of devices for removably securing the rim on the body, each comprising a bracket fixed to one side of said body, a clamping lug pivotally connected to said bracket, having an extension to pass between the rim and the wheel-body, and a cam-lever pivoted to said bracket to swing laterally, the lug and lever being provided with coöperating cam-surfaces for operating the wedge-lug to secure the rim.

WILLIAM T. McLEAN.